Jan. 15, 1924.  1,480,661
F. H. BROWN
DIFFERENTIAL PRESSURE RESPONSIVE DEVICE
Original Filed July 2, 1920
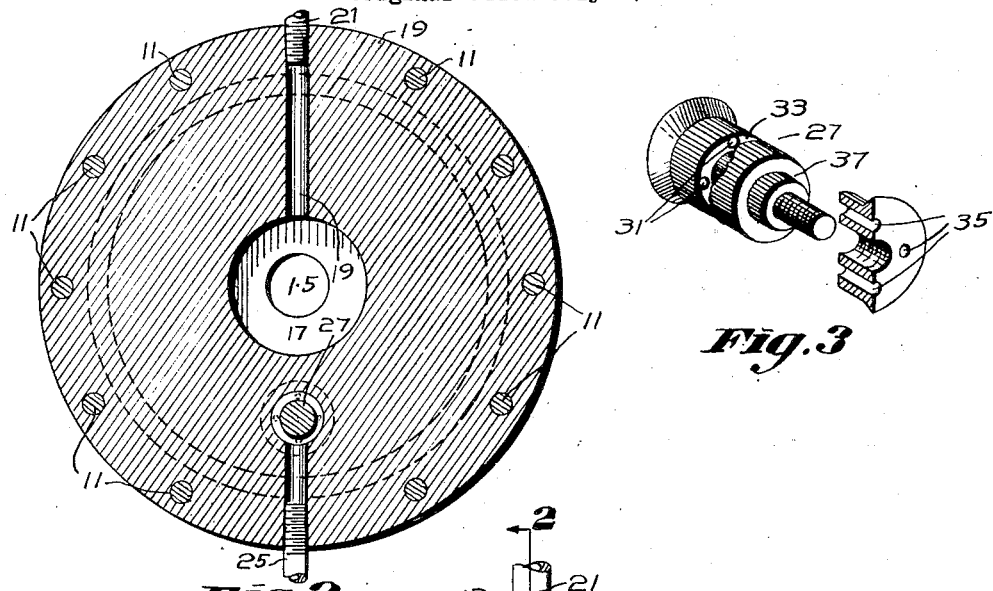
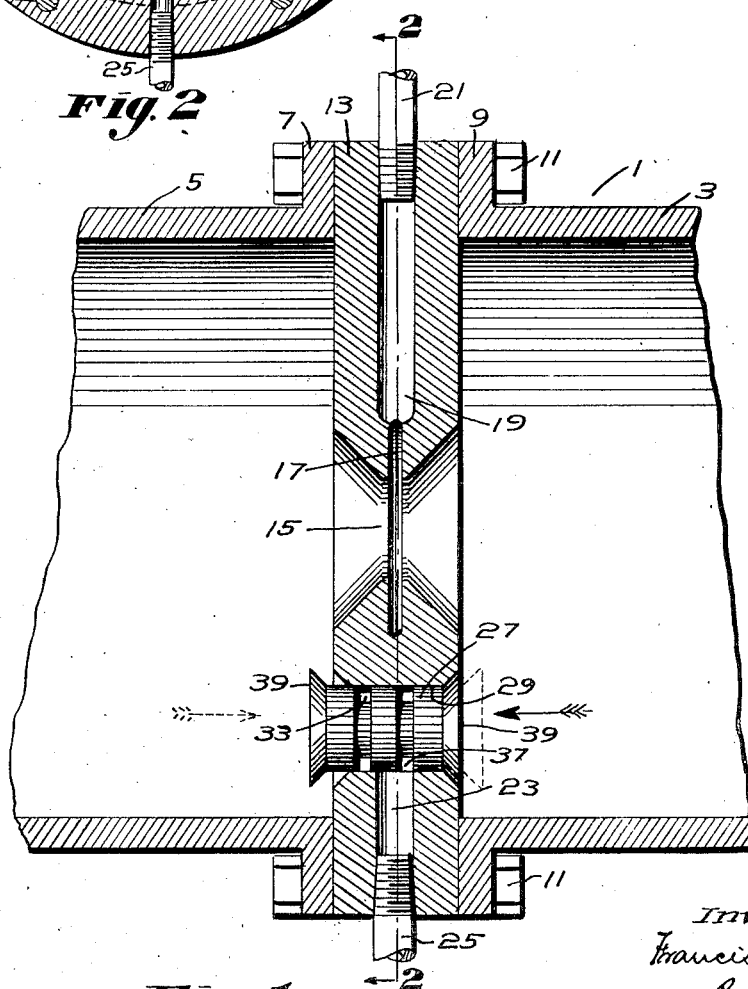

Patented Jan. 15, 1924.

1,480,661

UNITED STATES PATENT OFFICE.

FRANCIS H. BROWN, OF GLEN OLDEN, PENNSYLVANIA.

DIFFERENTIAL-PRESSURE RESPONSIVE DEVICE.

Application filed July 2, 1920, Serial No. 393,640. Renewed June 8, 1923.

*To all whom it may concern:*

Be it known that I, FRANCIS H. BROWN, a citizen of the United States, residing at Glen Olden, in the county of Delaware and State of Pennsylvania, have invented an Improvement in Differential-Pressure Responsive Devices, of which the following description, in connection with the accompanying drawings, is a specification, like characters on the drawings representing like parts.

The invention to be hereinafter described relates to differential pressure responsive devices which may be employed for indicating, registering, measuring, regulating and other purposes.

Orifice plates have been employed for these purposes. As is well known, the orifice having an opening less than the conductor in which it is mounted, causes differential pressures of the fluid at opposite sides of the orifice plate. To transmit these pressures, it has been customary to connect pipes to the conductor adjacent opposite sides of the orifice plate, but the arrangement of the pipes and their connection with devices co-operating therewith has been such that one of the pipes will transmit static pressure from one side of the orifice plate only. Therefore, if it is desired to reverse the direction of flow of the fluid through the conductor, it has been necessary to disconnect the pipes, exchange the same, and re-connect the pipes to the conductor, or it has been necessary to provide the pipes with cross connections and an arrangement of manually operable valves, so that static and kinetic pressures may be alternatively transmitted from opposite sides of the orifice plate. These, however, are objectionable operations consuming considerable time and requiring the services of intelligent workmen.

In many instances it is desirable that the differential pressures may be promptly transmitted on flow of fluid in either direction through the conductor. For example, in power plants it is customary to provide steam generator units which may be alternately operated, one during the day, and the other during the night, or one to be always in readiness for operation if emergency requires the other to be shut down. It is customary to conduct steam developed by these generators from mains to a common header provided with an orifice plate intermediate the points of connection of said mains with the header. Valves may be provided in the steam mains for the respective generator units, so that the steam may be admitted alternatively from said mains. The steam will flow in one direction through the header when coming from the main of one of the generator units, and will flow in the opposite direction through the header when coming from the main of the other steam generator unit. It is, therefore, desirable that the orifice device shall automatically transmit the differential pressures, static and kinetic, when the steam is flowing in either direction through the header, without requiring adjustment or attention on the part of the engineer.

The principal aim and purpose of the present invention, therefore, is to provide a simple and efficient orifice device which will automatically transmit the differential pressures, static and kinetic, when steam or other fluid is flowing in either direction through the conductor in which the orifice device is mounted.

With the aforesaid and other purposes in view, the character of the invention will be best understood by reference to the following description of one good form thereof shown in the accompanying drawing, wherein:

Fig. 1 is a longitudinal section on a horizontal plane through a conductor equipped with the pressure responsive device embodying the invention;

Fig. 2 is a transverse section taken on line 2—2 of Fig. 1; and

Fig. 3 is a perspective view of details to be referred to.

Referring to the drawings, 1 designates a conductor which may conveniently be formed of standard sections 3 and 5 having flanges 7 and 9.

The orifice device embodying the invention may conveniently be mounted between said flanges and may be secured thereto by bolts 11 passing through said flanges and the orifice device.

This orifice device, in the present instance of the invention, comprises a plate 13 conveniently circular in form and having a central orifice 15 substantially smaller than the internal diameter of the conductor. The edges of the orifice may desirably be bevelled in opposite directions so as to form a fairly sharp orifice.

Suitable means may be provided to transmit the kinetic steam pressure of the fluid as it passes through the orifice. To accomplish this, in the present instance, a circumferential groove 17 may be formed in the orifice plate and communicate with the orifice. Communicating with said groove is a port 19 extending radially outward to the periphery of the orifice plate, and said port may be tapped for connection with the pipe 21 which may transmit the kinetic pressure to the point desired. The construction is such that the kinetic steam pressure at the orifice may be efficiently transmitted from the entire periphery of the orifice. This feature of the construction may be similar to that disclosed in my copending application Serial No. 368,665, filed March 25, 1920.

As stated, it is desirable that the static pressure of the steam may be properly transmitted when the fluid is flowing in either direction through the conductor and the orifice. To accomplish this, in the present instance of the invention, the orifice plate may be provided with a port 23 extending radially outward to the periphery of the plate, where it may be tapped to receive a pipe 25 for conducting the static pressure to the point desired. Co-operating with this port is a valve 27 conveniently in the form of a spool slidably mounted in a bore 29 extending transversely to the plane of the orifice plate at the inner end of the port 23. This valve may have passages leading from opposite sides of the orifice plate to the port 23, and adapted for alternative communication therewith. In the present instance, passages 31 are provided at one end of the valve extending axially thereof and communicating with a circumferential passage 33. The valve is also provided with axial passages 35 at the opposite end thereof communicating with a circumferential passage 37. The valve may have a length somewhat greater than the thickness of the orifice plate, and the opposite ends of the valve may be provided with flanges 39 for limiting movements of the valve in opposite directions. To enable the valve as constructed to be readily mounted in the orifice plate, it may be formed of two sections, one having a threaded stud 41 adapted to be screwed into a tapped hole in the other.

The construction is such that when the fluid is flowing through the conductor toward the right, the fluid will press against the face of the valve exposed at the left side of the orifice plate, and automatically shift the valve toward the right. This will place the passages 31 and 33 in communication with the port 23 and place the passages 35 and 37 out of communication with said port. Then the valve will be in a position to transmit static pressures from the left side of the orifice plate to the port 23.

On the other hand, when the fluid is flowing through the conductor toward the left, the pressure of the fluid will act on the right hand face of the valve, thereby shifting it toward the left so as to place the passages 35 and 37 in communication with the port 23, and place the passages 31 and 33 out of communication with said port. Then the static pressure will be transmitted from the right of the orifice plate through the port 23.

Thus, the device described will be automatically responsive to the flow of fluid in either direction, and the kinetic and static pressures will always be transmitted properly by the device. After the device has been mounted in the conductor, it will automatically operate in response to flow of fluid in either direction, without requiring any change in the position thereof, or attention on the part of the engineer. Also, it is unnecessary to tap the conductor sections and enter pressure conducting pipes therein, since these pipes are connected directly to the orifice plate. Since necessity for pipes connected to the conductor sections is eliminated, it is unnecessary to provide valves to be manually operated to control the transmission of the static pressure when the fluid is flowing in opposite directions.

The pressure device described is simple in construction, efficient in operation, and will always reliably transmit the differential pressures as required.

This pressure device is adaptable for a great variety of uses. Among others, it is desirably adapted for co-operation with devices for indicating, registering, measuring and regulating purposes.

For some purposes it will be necessary to utilize the port for transmitting kinetic pressure variations, and it will suffice to use the means for transmitting static pressure variations. So far as I am aware, I am the first to provide means which will automatically respond to and transmit pressure variations when steam or other fluid is flowing in either of two directions.

It will be understood that the invention is not limited to the specific embodiment shown, and that various deviations may be made therefrom without departing from the spirit and scope of the appended claims.

What is claimed is:—

1. A differential fluid pressure responsive device, comprising a plate having therein an orifice adapted to have fluid flow therethrough, a groove communicating with said orifice, a port for transmitting kinetic fluid pressure from said groove, a port for transmitting static fluid pressure, and valve means automatically responsive to the direction of flow of fluid through said orifice for enabling transmission of static fluid pressure through said static pressure port on flow of fluid toward either side of said plate.

2. A differential pressure responsive device, comprising means having therein an orifice adapted to have fluid flow therethrough, a port for transmitting fluid pressure from said orifice, a port for transmitting fluid pressure from opposite sides of said means, and flow responsive means automatically to place the latter port in communication with either side of said means.

3. A differential pressure responsive device, comprising means having therein an orifice for producing differential pressures of fluid at opposite sides of said means on flow of fluid through said orifice, and means automatically responsive to the direction of flow of the fluid through said orifice for transmitting fluid pressure through said means from either side of said means.

4. A differential pressure responsive device, comprising means having therein an orifice for producing differential pressures of fluid at opposite sides of said means, a pressure transmitting port in said means; and a valve having passages and means responsive to the direction of flow of the fluid for automatically shifting said valve to admit fluid from one of the passages to the port whereby the port may be placed in communication with either side of said means.

5. A differential pressure responsive device, comprising a plate adapted for insertion in a fluid conductor and having therein an orifice, a pressure transmitting port, and a valve mounted in said plate and having passages therein and faces exposed to pressure at opposite sides of said plate and responsive to the direction of flow of fluid through the conductor for automatically shifting said valve to place one or the other of said passages in communication with said port.

6. A differential pressure responsive device, comprising a plate having therein an orifice, a port communicating with said orifice for transmitting kinetic pressure of fluid flowing through said orifice, and means automatically responsive to the direction of flow of the fluid for transmitting static pressure of the fluid from either pressure side of the orifice plate.

7. A differential pressure responsive device, comprising means adapted to produce differential pressures of a fluid flowing through a conductor, and means responsive to and automatically controlled by the direction of flow of the fluid for transmitting fluid pressure from the conductor when flowing in either direction therethrough.

8. A differential pressure responsive device comprising a member for insertion into a conductor and having provision to produce differential pressures of a fluid flowing through the conductor, and pressure responsive means automatically shifted by the fluid for transmitting pressure of the fluid from either side of said member according to the direction of flow of fluid through the conductor.

9. A device of the character described, comprising, a pressure transmitting member for application to a fluid conductor, and means co-operating with said member automatically controlled by the direction of flow of the fluid to render the member effective to transmit fluid pressure when the fluid is flowing through the conductor in either of two opposite directions.

10. A device of the character described, comprising, a pressure transmitting member for application to a fluid conductor, and valve means co-operating with said member automatically responsive to the direction of flow of fluid through the conductor for rendering said member effective to transmit fluid pressure from one or the other side of said member depending on the direction of flow of the fluid.

11. A differential fluid pressure responsive device, comprising a plate having therein an orifice formed with oppositely beveled edges for the passage of fluid therethrough in either direction, an annular groove surrounding the orifice and extending from the orifice into the plate a substantial depth, a port leading from the annular groove so that the pressure in the latter may be established in the former, and a port adapted to be placed in communication with the fluid at either side of the plate.

12. A differential fluid pressure responsive device, comprising a plate having therein an orifice formed with oppositely beveled edges for the passage of fluid therethrough, an annular groove surrounding the orifice and extending from the orifice into the plate, and a port leading from the annular groove so that the pressure in the latter may be established in the former.

In testimony whereof, I have signed my name to this specification.

FRANCIS H. BROWN.